United States Patent Office 3,561,921
Patented Feb. 9, 1971

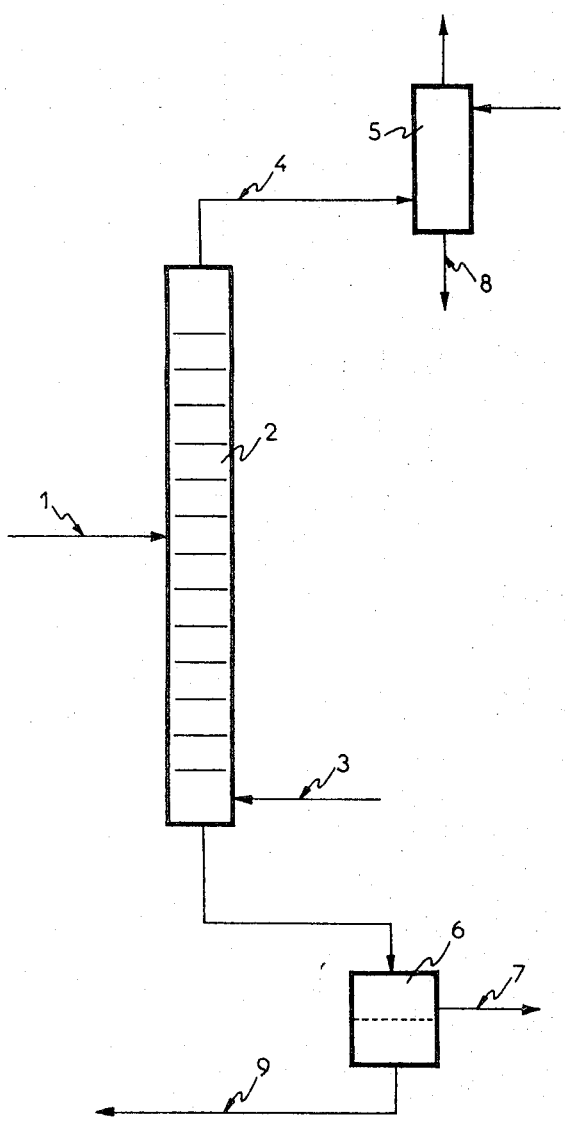

3,561,921
MANUFACTURE OF AMMONIA AND SULFUR FROM AMMONIUM SULFIDE SOLUTIONS
Henri Gruhier, Chatillon-sur-Bagneux, and Philippe Renault, Neuilly-sur-Seine, France, assignors to Institut Francaise du Petrole, des Carburants et Lubrifiants, Rueil Malmaison (Hauts-de-Seine), France
Filed June 12, 1968, Ser. No. 736,310
Claims priority, application France, June 23, 1967, 111,809
Int. Cl. C01c 1/00
U.S. Cl. 23—193     6 Claims

ABSTRACT OF THE DISCLOSURE

Ammonia and sulfur are obtained from ammonium sulfide or ammonium bisulfide solutions by air oxidation at 10–80° C. in the presence of a phosphoric acid ester in the liquid phase. The sulfur is separated and recovered as such by filtration, the ester of phosphoric acid is separated from the aqueous phase by decantation, and the ammonia is recovered as aqueous ammonia.

---

This invention relates to an improved process for manufacturing sulfur and ammonia from ammonium sulfide- and/or bisulfide-containing solutions.

This process consists of carrying out the oxidation of the ammonium sulfide and/or bisulfide-containing solution, in the presence of a solvent such as hereinafter defined, by means of a gas containing molecular oxygen.

Hydrogen sulfide $H_2S$ is known as being generally troublesome either by its noxious effect in the further use of the gases containing the same, or due to the fact that it cannot be directly rejected to the ambient atmosphere, for instance when contained in combustion gases.

Accordingly these gases are generally subjected to a purification by washing for instance by means of an aqueous solution of ammonia. There is thus obtained ammonium sulfide and/or bisulfide from which it is highly desirable to recover the ammonia in order to reduce the cost of the purification step.

The object o fthe process according to the invention is precisely to regenerate said ammonia, said regeneration is accompanied with a production of sulfur.

Of course, the process according to the invention is applicable to any ammonium sulfide- and/or bisulfide-containing solution either resulting or not from the washing of acid gases.

The process of the invention can thus be used for treating an aqueous, orgnaic or hydro-organic (such a mixture glycol-water) solution which contains sulfide, inasmuch as this solution forms a separate phase with the solvent (the reason for this being stated hereafter).

As solvents there can be used according to this invention one or more phosphoric esters at least partially immiscible with water and complying with the general formula $PO(OR)_3$, wherein the remainders R, which may be identical to or different from each other, are selected amongst hydrocarbon monovalent radicals each containing for instance from 1 to 20 carbon atoms and preferably at least 3 carbon atoms, in particular the alkyl, cycloalkyl and aryl radicals, the radicals conforming to the formula —$(R_1$—O$)_n$—$R_2$ wherein $R_1$ is a hydrocarbon remainder containing 2 or 3 carbon atoms, $R_2$ a hydrogen atom or a hydrocarbon remainder containing for example from 1 to 5 carbon atoms, and $n$ an integer equal to 1, 2 or 3.

By way of non-limitative examples the following specific solvents can be used: the tributyl ester of orthophosphoric acid, the triisobutyl ester of orthophosphoric acid, the cresyl triesters of orthophosphoric acid, the monocyclohexyl-di-n-propyl orthophosphate, the orthophosphoric triester of ethyleneglycol monobutylether or tri(2-butoxyethyl)orthophosphate etc.

The phosphoric ester, or the mixture of phosphoric esters may optionally contain other compounds in comparatively small amounts inasmuch as the whole forms two phases with water. It may also be diluted by means of solvents of known type.

The phosphoric esters are of interest since they facilitate the oxidation reaction (by reducing or avoiding the formation of oxygenated derivatives of sulfur such as sulfates, thiosulfates) while being of low miscibility with water, which facilitates their use in the industrial apparatus of the type schematically described hereinafter.

The following description will refer to the accompanying drawing which illustrates one specific embodiment of the invention, given by way of non-limitative example.

The aqueous or hydro-organic solution, issuing for instance from an apparatus for carrying out absorption of $SH_2$ by means of an aqueous solution of ammonia, is introduced by duct 1 preferably in the median portion of a column 2, filled up with a solvent such as previously defined; at the bottom of the column there is injected, through line 3, air or another gas containing molecular oxygen. A portion of the ammonia is evacuated at the top of the column through line 4 together with the excess of air. This portion of amomnia is recovered by the washing with water in apparatus 5. The resulting aqueous solution of ammonia is removed through line 8. At the bottom of the column 2 is recovered an aqueous solution of ammonia substantially free from $SH_2$ and containing crystallized sulfur which is separated in filter 6. The sulfur is withdrawn through line 7.

The so-regenerated aqueous solutions of ammonia may be recycled to the apparatus for absorption of $SH_2$ (not shown) through lines 8 and 9.

The solvent, eventually carried along with the ammonia-sulfur mixture, may be easily recovered by decantation of the solution, after filtration, due to the immiscibility of said solvent in the aqueous solutions. However, in practice, the amount of solvent so carried along with the ammonia-sulfur mixture is very small or nonexistent.

The temperature at which the oxidation of the ammonium sulfides and/or bisulfides is conducted may be, for instance, between 10 and 80° C. and more particularly between 40 and 50° C.

The following non-limitative examples illustrate the invention.

EXAMPLE 1

The feed consists of an aqueous solution containing 2 moles per liter of ammonium bisulfide $SHNH_4$. It is introduced at a rate of 50 liters per hour in the median portion of a column with perforated plates, filled up with triisobutylphosphate. The air is bubbled from the bottom of the column with a flow rate of 15 m.$^3$ per hour. The column is maintained to a temperature in the vicinity of 35° C.

The yield in sulfur is of 95%, the remaining part consisting of oxygenated compounds of sulfur such as thiosulfate and sulfate.

About 20% of the ammonia contained in the ammonium sulfide solution is drawn along with the excess of air and recovered by washing with water at the top of the column. The remaining part of 80% is obtained at the foot of the column, after separation of the sulfur.

EXAMPLES 2 AND 3

Example 1 is repeated except that there is used as solvent tributylphosphate (Example 2) and tri (2-butoxyethyl)phosphate (Example 3). All other conditions being kept unchanged, there are obtained in these two experiments substantially the same results as according to Example 1.

What is claimed as this invention is:

1. A process for the recovery of sulfur and ammonia from a solution containing at least one compound selected from the group consisting of ammonium sulfide and bisulfide, which comprises contacting said solution at a temperature of about 10 to 80° C. with a gas containing molecular oxygen and at least one ester of phosphoric acid in liquid phase and of the formula $PO(OR)_3$ wherein R is selected from the group consisting of a hydrocarbon monovalent radical having from 1 to 20 carbon atoms and a radical of the formula $-(R_1-O)_n-R_2$ wherein $R_1$ is a hydrocarbon radical having 2 to 3 carbon atoms and $R_2$ is selected from the group consisting of a hydrogen atom and a hydrocarbon radical having from 1 to 5 carbon atoms, and $n$ is an integer equal to 1, 2, or 3, said ester being at least partially immiscible with water, and recovering sulfur and ammonia from the solution.

2. A process according to claim 1 wherein the ester of phosphoric acid is triisobutylorthophosphate.

3. A process according to claim 1 wherein the ester of phosphoric acid is tri(2-butoxyethyl) orthophosphate.

4. A process according to claim 1 wherein the ammonium sulfide and bisulfide are obtained by washing a hydrogen sulfide-containing gas with an aqueous solution of ammonia.

5. A process according to claim 1, wherein the ester of phosphoric acid is selected from the group consisting of triisobutylphosphate, tributylphosphate and tri(2-butoxyethyl)phosphate.

6. A process according to claim 1, wherein said solution is contacted at a temperature of about 40 to 50° C.

References Cited

UNITED STATES PATENTS 2,245,130   6/1941   Guillissen _____ 23—193
3,441,379   4/1969   Renault _____ 23—226

OSCAR R. VERTIZ, Primary Examiner

H. S. MILLER, Assistant Examiner

U.S. Cl. X.R.

23—224